US012495411B2

(12) United States Patent
Chaudhuri et al.

(10) Patent No.: US 12,495,411 B2
(45) Date of Patent: Dec. 9, 2025

(54) SYSTEMS AND METHOD OF IMPROVED RESOURCES SHARING IN 5G/6G WIRELESS SYSTEM

(71) Applicant: Radisys India Private Limited, Bangalore (IN)

(72) Inventors: Saptarshi Chaudhuri, Bengaluru (IN); Shekar Nethi, Hyderabad (IN); Chandrasekaran Mohandoss, Chennai (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 85 days.

(21) Appl. No.: 18/246,690

(22) PCT Filed: Jul. 29, 2022

(86) PCT No.: PCT/IB2022/057063
§ 371 (c)(1),
(2) Date: Mar. 27, 2023

(87) PCT Pub. No.: WO2023/012624
PCT Pub. Date: Feb. 9, 2023

(65) Prior Publication Data
US 2023/0389004 A1 Nov. 30, 2023

(30) Foreign Application Priority Data
Jul. 31, 2021 (IN) .............................. 202141034578

(51) Int. Cl.
H04W 72/1263 (2023.01)
H04L 5/00 (2006.01)
(Continued)

(52) U.S. Cl.
CPC ....... *H04W 72/1263* (2013.01); *H04L 5/0057* (2013.01); *H04L 47/6275* (2013.01); *H04W 72/569* (2023.01)

(58) Field of Classification Search
None
See application file for complete search history.

(56) References Cited

U.S. PATENT DOCUMENTS 10,098,133 B2  10/2018  Jersenius et al.
2015/0257073 A1  9/2015  Park et al.
(Continued)

FOREIGN PATENT DOCUMENTS

RU  2449502 C2  4/2012
WO  2017206169 A1  12/2017
WO  2019160384 A1  8/2019

OTHER PUBLICATIONS

International Search Report from International Appl. No. PCT/IB2022/057063, mailed Nov. 30, 2022.

*Primary Examiner* — Anh Vu H Ly
(74) *Attorney, Agent, or Firm* — FINNEGAN, HENDERSON, FARABOW, GARRETT & DUNNER LLP.

(57) ABSTRACT

Although MU-MIMO is a promising technology for wireless system but the field implementation for MU-MIMO has not been so successful, one of the reasons is significant overhead required to dynamically adapt to any changes in the wireless channel. The current technology is limited by the implementation complexity and have not yielded good performance in the field setup. Hence, the current disclosure proposes an end-to-end system and method to achieving MU-MIMO transmission, by providing a flexible framework for the selection of channel decomposition techniques, and significantly reduce computation complexity by limiting the number of prospective MU-MIMO candidates. The disclo- (Continued)

sure currently considers the QoS priority while selecting MU-MIMO candidate list which allows us to maintain the scheduler KPIs.

20 Claims, 12 Drawing Sheets

(51) Int. Cl.
*H04L 47/6275* (2022.01)
*H04W 72/566* (2023.01)

(56) References Cited

U.S. PATENT DOCUMENTS

| | | | |
|---|---|---|---|
| 2016/0234858 A1* | 8/2016 | Bao | H04W 72/1268 |
| 2016/0316458 A1* | 10/2016 | Kwon | H04W 72/23 |
| 2017/0201968 A1 | 7/2017 | Nam et al. | |
| 2018/0063856 A1* | 3/2018 | Yang | H04B 7/0639 |
| 2019/0028170 A1 | 1/2019 | Zhang et al. | |
| 2020/0092685 A1* | 3/2020 | Fehrenbach | H04W 36/08 |
| 2022/0312432 A1* | 9/2022 | Chen | H04W 72/542 |
| 2023/0353294 A1* | 11/2023 | Bontu | H04W 16/02 |
| 2024/0373415 A1* | 11/2024 | Bontu | H04L 5/0064 |

\* cited by examiner

SYSTEMS AND METHOD OF IMPROVED RESOURCES SHARING IN 5G/6G WIRELESS SYSTEM

TECHNICAL FIELD

The present disclosure relates to the field of wireless MU-MIMO instruments for improved resource sharing in a distributed wireless communication system. In particular, this disclosure pertains to systems and methods for an end-to-end solution for achieving MU-MIMO transmission, by providing a flexible framework for the selection of channel decomposition and significantly reduce computation complexity by limiting the number of prospective MU-MIMO candidates.

BACKGROUND

Background description includes information that may be useful in understanding the present invention. It is not an admission that any of the information provided herein is prior art or relevant to the presently claimed invention, or that any publication specifically or implicitly referenced is prior art.

Communication demands, and particularly wireless communication demands, continue to increase. Next generation wireless communication systems, commonly referred to as "5G/6G communication systems" are being developed, to meet these demands. One important technology to be adopted by 5G/6G communication systems involves the use of base stations which have a large number of input and outputs (sometimes referred to as a massive MIMO system) to serve a large number of communication users. Massive MIMO uses a large excess of antennas and time division duplex operation to serve multiple active user terminals at the same time. Extra antennas focus energy into ever-smaller regions of space to bring huge improvements in throughput and radiated energy efficiency. Such massive MIMO systems may have hundreds of transmit (Tx) and receive (Rx) channels and corresponding RF antennas.

Unlike previous generations of mobile networks, the fifth/sixth generation (5G/6G) technology is expected to fundamentally transform the role that telecommunications technology plays in the industry and society at large. Thus, 5G/6G wireless communication system is expected to support a broad range of newly emerging applications on top of the regular cellular mobile broadband services. These applications or the services that would be supported can be categorized into enhanced mobile broadband, massive deployment of internet of things device, industrial devices with multi-modes and ultra-reliable low latency communication. Using these services, users could do video conference, television broadcast, and video on-demand (simultaneous streaming) applications using different types of multimedia services over internet, high speed browsing, voice call, gaming, connected car communications, connected industrial machines, etc., In order to support the above applications and services, the 3GPP standard body proposes the following network deployment architecture as per the document http://www.3gpp.org/DynaReport/38300.htm V15.3) which is summarized in FIG. 1. The detailed description of each of the network elements are provided in the detailed description section. In summary, the gNB provides the 5G New Radio's user plane and control plane protocol terminations towards the User Equipment. The gNBs are also connected by means of the NG interfaces to the 5G Core, more specifically to the AMF (Access and Mobility Management Function) by means of the NG2 interface (NG-Control) interface and to the UPF (User Plane Function) by means of the NG3 (NG-User) interface.

The communication between the gNB and UE happens through the wireless interface using the protocol stacks. Whenever, the user traffic data from the Data Network (in FIG. 1) needs to be sent to the user equipment, it passes through the UPF and gNB and reaches the user equipment in the downlink direction and vice-versa for the uplink direction. In order to schedule the user's traffic data in the downlink direction, the two main PHY layer functionalities that comes in consideration are (a) Physical-layer processing for physical downlink shared channel (PDSCH) (b) Physical-layer processing for Physical downlink control channels (PDCCH). The user's traffic data are sent through the PDSCH but the user's signalling data of the user's traffic data with respect to (i) Modulation (ii) Coding rate (iii) Size of the user's traffic data (iv) Transmission beam identification (v) Bandwidth part (vi) Physical Resource Block etc., are been send via PDCCH. As per the document at http://www.3gpp.org/DynaReport/38300.htm V15.3, the downlink as well as the uplink transmission happens through the Cyclic Prefix based Orthogonal Frequency Division Multiplexing (CP-OFDM), which is part of the PHY layer. So, in order to do the transmission, the CP-OFDM uses the Physical Resource Block (PRB) to send both the user's traffic data over PDSCH as well as user's signaling data over PDCCH. As per the document at http://www.3gpp.org/DynaReport/38300.htm V15.3, the Physical Resource Block (PRB) has been built using the Resource Elements. For the downlink direction, the upper layer stacks (above PHY from Appendix-B), assigns the number of Resource Elements to be used for the PDCCH and PDSCH processing. As per http://www.3gpp.org/DynaReport/38300.htm V15.3, there are four important concept that has been defined for with respect to resources and the way the resources are being group to be given for PDCCH. These concepts are (a) Resource Element: It is the smallest unit of the resource grid made up of one subcarrier in frequency domain and one OFDM symbol in time domain. (b) Resource Element Group (REG): One REG is made up of one resource block (12 Resource Element in frequency domain) and one OFDM symbol in time domain. (c) Control Channel Element (CCE): A CCE is made up multiple REGs. The number REG bundles within a CCE varies. (d) Aggregation Level: The Aggregation Level indicates how many CCEs are allocated for a PDCCH.

In order to transmit the PDCCH and PDSCH information using the CCEs in the downlink direction, the document at http://www.3gpp.org/DynaReport/38300.htm V15.3 defines another concept called bandwidth part (BWP). BWP enables more flexibility in how allocating CCEs resources are assigned in each carrier. The BWP enables multiplexing of different information of PDCCH and PDSCH, thus enabling better utilization and adaptation of operator spectrum and UE's battery consumption. 5G NR's maximum carrier bandwidth is up to 100 MHz in frequency range 1 (FR1: 450 MHz to 6 GHz), or up to 400 MHz in frequency range 2 (FR2: 24.25 GHz to 52.6 GHz) that can be aggregated with a maximum bandwidth of 800 MHz.

As per the document at http://www.3gpp.org/DynaReport/38331.htm V15.3, for a gNB system, there could be multiple candidates defined for the each of the aggregation levels. Thus, using the multiple candidates per aggregation levels and for getting the number of CCEs per aggregation level, the gNB system calculates the total number of CCEs requirement. This total number of CCEs shall be finally used for the Control Resource Set (CORESET) calculation. Hence, the CORESET comprises of multiples REGs in frequency domain and '1 or 2 or 3' OFDM symbols in time domain.

The 5G NR deployment mainly centred over maximizing the amount of time and frequency resources that can be flexibly utilized. One of the features which could increase the capacity of the 5G system is Multi-User MIMO. In radio, multi-user MIMO (MU-MIMO) is a set of advanced MIMO, multiple-input and multiple-output, technologies where the available antennas are spread over a multitude of independent access points and independent radio terminals—each having one or multiple antennas.

In multi-user MIMO systems, the spatial degrees of freedom offered by multiple antennas can be exploited to enhance the overall system capacity by scheduling multiple users to simultaneously share the spatial channel. This can be achieved when the transmitter is aware of the channel state information (CSIT) and applies the appropriate precoders to maximize the signal at the UE.

While there is substantial cost involved to know the channel state information at the transmitter, i.e. pilot signal transmission overhead. MU-MIMO techniques still possess several key advantages:
- MU-MIMO is immune to propagation channel impairments like channel rank loss and antenna correlation.
- There is no need to have multiple antennas at the terminal level to obtain spatial multiplexing gain at the base station.
- MU-MIMO techniques enable capacity improvements proportional to the number of antennas at the base station.

However, the 3GPP specification fails to provide mechanism for MU-MIMO User Selection, Resource Distribution and Resource Sharing. Some of the challenges of User Selection, Resource Distribution and Resource Sharing mechanisms have not been addressed by the below prior arts. Every of these prior art targets the solution at User Selection, Resource Distribution and Resource Sharing sub-entity for which is then finally given to Scheduler for user transmission.

In a prior art U.S. Pat. No. 8,019,031 B2, titled "User selection Method and User Selection Device for Multiuser MIMO communication", this solution provides method to calculate orthogonal co-efficient by using channel vector of each user. The received SINR and the orthogonal co-efficient computed are then used to compute corrected SINR. Users are then selected based on corrected SINR and finally update orthogonal co-efficient by using Gram Schmidt orthogonalization for next user selection. Additionally, user having highest priority are expressed by the function of corrected SINR and user having a large support data rate weighted by the reciprocal number of an average support data rate is selected. However, the drawback in this disclosure is that due to rounding errors when implemented, GS orthogonalization quite does not yield orthogonal errors. The loss of orthogonality can be a major concern and deems GS orthonormalization as numerically unstable.

In another prior art, U.S. Pat. No. 9,456,452 B2, titled "Scheduling method of a Multi-User Multi-Input Multi-Output communication system", this solution pertains to transmit a channel state information request signal to a UE when there is data to be sent. The UE will calculate the effective channel vector (from which effective channel gain is computed). Upon CSI transmission by UE within a pre-defined standby time, perform scheduling for the UE. Any case when CSI feedback fails, and if the degree of freedom (DoF) remain, another CSI request signal is sent to the UE. If DOF does not remain, scheduling is terminated. Extract beam form matrix based on all CSI received from all the UEs and transmitting data to the user equipment. However, the drawback in this disclosure is that this approach is defined for LTE system. However if implemented in 5G systems, this approach requires gNB to request CSI information from each UE, this increase overhead significantly. Additionally, since CSI-Type II is only recommended for MU-MIMO transmission and only supports 2 layers, this will severely limit the spatial gains.

In another prior art, US 2015/0282122 A1, titled "Method and Apparatus for scheduling in a Multi-Input Multi-Output system", this solution classifies multiple beams into group of beam sets for MIMO configuration and determining at least one preferred beam set for a channel from a set of transmission beams of a BS and set of receiving beams of the MS. Thereafter, transmitting information about the (at-least) preferred beam set to the BS to generate information indicating interference that at least one transmission beam of the BS exerts to the MS, based on a preferred reception beam comprised in the at least one preferred beam set and transmitting the generated interference information to the BS. However, the drawback in this disclosure is that this approach has overhead in terms negotiation for beam grouping, and broadcast messages for beam and best beam selection.

In another prior art, U.S. Pat. No. 9,698,889 B2, titled "Resource allocation patterns for scheduling services in a wireless network", this solution approach depends on UE's sending a sounding signal and the eNode B to determine Angle of Arrival (AoA) for all the major paths to the sounding signal from each of the UEs to the eNode B. Using the AoA to determine UEs in to one or more MU-MIMO sets and finally schedule the transmission for UEs from the candidate MU-MIMO sets. However, the drawback in this disclosure is that is uses AoA for the determination of MU-MIMO will work if the channel is static, however because of the dynamic nature of the channel finding UEs which have orthogonal AoA might be challenging.

In another prior art, US 2015/0280888 A1, titled "Flexible MIMO Resources Allocation Through Cross Correlation Nulling and Frequency Domain Segmented received processing", this solution compute channel transfer function for the received signal (Multiple layers of MIMO transmission), estimating the channel transfer function that can include finding the correlation between received signals. However, the drawback in this disclosure is that First/Second reference signals could be, partially overlapping due to different sizes, layers of MIMO transmission, Demodulated reference signal, Partitioning aggregate frequencies into frequency range elements, where first/second signal are part of the frequencies occupied and frequency is selective.

There has been significant research work published in the literature on the MU-MIMO systems. However, the field implementation for MU-MIMO has not been so successful, one of the reasons would be the significant overhead required to dynamically adapt to any changes in the wireless channel. The current technology is limited by the implementation complexity, the sub-optimal solution may not have yielded good performance in the field setup.

The main task of the scheduler is to schedule resources (symbols/sub-carriers, transmission powers and users) in the cellular eco system. There are various independent and dependent parameters that influences the decision-making policies of the scheduler. Additionally, MU-MIMO scheduler exploits spatial domain and schedules multiple users in same frequency and time domain, with spatial separation. Existing optimal solutions which achieve the theoretical max. are not suitable for deployment as the computation complexity required per TTI would not be maintained for real time requirements in 5G cellular systems. Hence, a trade-off between achieving optimal solution and the feasibility of implementation should be considered.

Thus, there is a need for improved MU-MIMO with respect to resource allocation mechanism without compromising on the user data-rate requirements. Hence, this disclosure is proposing an end-to-end method to achieving MU-MIMO transmission, by providing a flexible framework for the selection of channel decomposition techniques, and significantly reduce computation complexity by limiting the number of prospective MU-MIMO candidates. In addition, this disclosure also consider the QoS priority while selecting MU-MIMO candidate list which allows to maintain the scheduler KPIs.

While there are established research in the field of precoder design for MU-MIMO transmission, this disclosure provides a design of low complexity solution which could be practical enough to be realized on a product while achieving reasonable accuracy in terms of precoder design. This disclosure provides design for a precoder which would compensate for channel uncertainties, eliminate intra layer interference for a UE and simultaneously mitigate interference from co-scheduled UEs which are a challenging task.

Objects of the Present Disclosure

Some of the objects of the present disclosure, which at least one embodiment herein satisfies are as listed herein below.

It is an object of the present disclosure to provide a system and a method that support end-to-end method to achieving MU-MIMO transmission, by providing a flexible framework for the selection of channel decomposition techniques, and significantly reduce computation complexity by limiting the number of prospective MU-MIMO candidates.

It is an object of the present disclosure to provide a system and a method that provides improved MU-MIMO with respect to resource allocation mechanism without compromising on the user data-rate requirements.

It is an object of the present disclosure to provide a system and a method that considers the QoS priority while selecting MU-MIMO candidate list which allows to maintain the scheduler KPIs.

It is an object of the present disclosure to provide a system and a method that provides a design of low complexity solution which could be practical enough to be realized on a product while achieving reasonable accuracy in terms of precoder design.

It is an object of the present disclosure to provide a system and a method that provides a design for a precoder which would compensate for channel uncertainties, eliminate intra layer interference for a UE and simultaneously mitigate interference from co-scheduled UEs which are a challenging task.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure provides for a system facilitating improved resource sharing in a distributed wireless communication system. The system may include a radio resource module (RRM) operatively coupled to any or a combination of one or more Multi input multi output (MIMO) base stations, one or more packet gateway nodes (NG1, NG2 . . . NGN) and a scheduler. In an embodiment, the one or more MIMO base stations, the one or more packet gateway nodes are communicatively coupled to one or more user equipment (UE) through a core network. In an embodiment, the scheduler may be configured to determine a user traffic data queued in the system, and, the RRM may include a processor that may execute a set of executable instructions that may be stored in a memory, upon which execution, the processor may cause the system to: receive from the one or more MIMO base stations, one or more data packets pertaining to parameters associated with one or more resources that require allocation in the wireless network to the one or more user equipment getting registered with the system through the respective packet gateway node. The processor may further cause the system to extract a first set of attributes from the one or more data packets, the first set of attributes pertaining to one or more services associated with the one or more resources; extract a second set of attributes from the scheduler, the second set of attributes pertaining to the user traffic data queued in the system associated with one or more services and extract a third set of attributes from a database operatively coupled to a centralized server, the third set of attributes pertaining to one or more priority services that gain precedence over one or more services, wherein the centralized server is further operatively coupled to the system (109). The processor may further cause the system to determine, based the extracted first, second and third set of attributes a service priority list and categorize, each user traffic data queue based on the service priority list. The processor may be further configured to calculate, a user priority metric for each user traffic data queue based on the categorized user traffic data queue and based on the calculated user priority metric, determine a number of UEs to be allocated with a predefined service.

In an embodiment, the processor may be further configured to: extract one or more Channel Quality Indicator (CQI) and one or more resource block (RB) constraints from the database operatively coupled to the centralized server; and, apply the one or more Channel Quality Indicator (CQI) and the one or more resource block (RB) constraints to determine whether the determined number of UEs to be allocated are for a single user (SU)-MIMO base station or a multi-user (MU) MIMO base station.

In an embodiment, the processor may be further configured to determine a number of candidate UEs for the MU-MIMO base station based on the number of UEs allocated to MU-MIMO base station.

In an embodiment, the processor may be further configured to determine one or more resource blocks (RB) for each candidate UE for the MU-MIMO base station and further determine one or more layers required for each said candidate UE for the MU-MIMO base station transmission.

In an embodiment, the processor may be further configured to receive one or more Sounding Reference Signal (SRS) resources from the one or more MIMO base stations (104) for each said candidate UE, extract one or more configured parameters associated with the one or more SRS resources; and, based on the one or more configured parameters, estimate one or more channel coefficients for each said candidate UE for MU-MIMO transmission.

In an embodiment, the processor may be further configured to compute a precoder based on the one or more channel coefficients.

In an embodiment, the precoder may be further configured to: determine an orthogonality basis for each said candidate UE, mitigate interference from one or more co-scheduled candidate UEs associated with each said candidate UE and, avoid Inter-layer interference in the one or more co-scheduled candidate UEs associated with each said candidate UE.

In an embodiment, the processor may be further configured to maintain separate queues for the one or more services.

In an embodiment, the one or more services comprise retransmission Queues, signalling radio bearer (SRB) Queues, Voice over New radio (VoNR) Queues, Guaranteed Bit Rate (GBR) Queues and Non-Guaranteed Bit Rate (Non-GBR) Queues.

In an embodiment, the processor may be further configured to store one or more operational parameters and one or more default configuration parameters of the system.

In an embodiment, depending on a geographical deployment area, the processor is further configured to accept the default configuration parameters of the system.

In an aspect, the present disclosure provides for a method facilitating improved resource sharing in a distributed wireless communication system. The method may include the step of receiving, by a processor, one or more data packets from the one or more MIMO base stations, the one or more data packets pertaining to parameters associated with one or more resources that require allocation in the distributed wireless network to one or more user equipment getting registered with the system through the respective packet gateway node. In an embodiment, the processor is operatively coupled to a radio resource module (RRM) may be operatively coupled to any or a combination of one or more Multi input multi output (MIMO) base stations, one or more packet gateway nodes (NG1, NG2, . . . NGN) and a scheduler. The one or more MIMO base stations, the one or more packet gateway nodes may be communicatively coupled to the one or more user equipment (UE) through a core network. In an embodiment, the scheduler may be configured to determine a user traffic data queued in the system. The method may further include the steps of extracting, by the processor, a first set of attributes from the one or more data packets, the first set of attributes pertaining to one or more services associated with the one or more resources, extracting, by the processor, a second set of attributes from the scheduler, the second set of attributes pertaining to the user traffic data queued in the method associated with one or more services and extracting, by the processor, a third set of attributes from a database operatively coupled to a centralized server, the third set of attributes pertaining to one or more priority services that gain precedence over one or more services, wherein the centralized server is further operatively coupled to the system. Further, the method may include the steps of determining, by the processor, based the extracted first, second and third set of attributes a service priority list and categorizing, by the processor, each user traffic data queue based on the service priority list. Furthermore, the method may include the steps of calculating, a user priority metric for each user traffic data queue based on the categorized user traffic data queue and based on the calculated user priority metric, determining, a number of UEs to be allocated with a predefined service.

BRIEF DESCRIPTION OF THE DRAWINGS

The accompanying drawings are included to provide a further understanding of the present disclosure and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure.

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
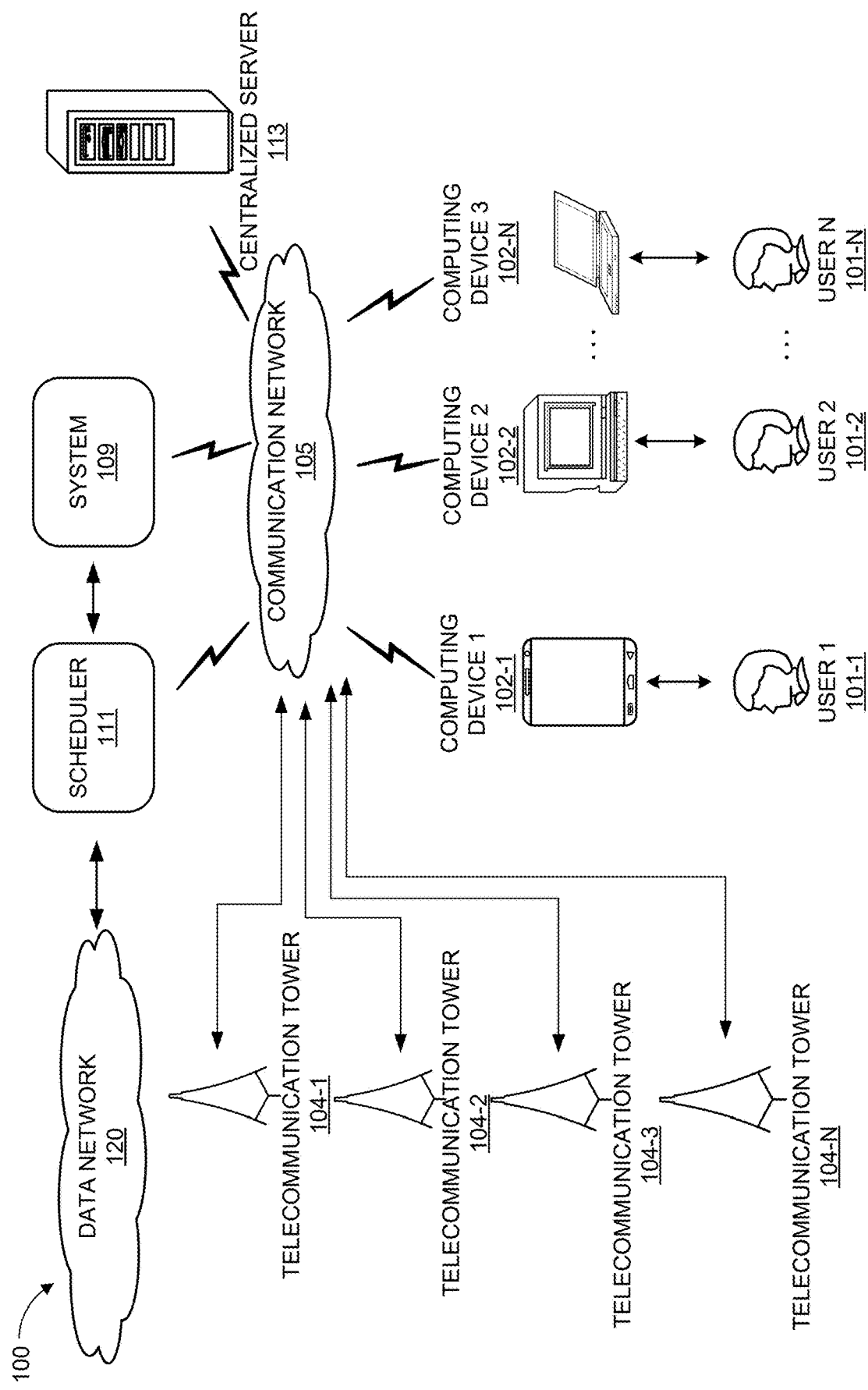
FIG. 1A illustrates an exemplary network architecture in which or with which the system of the present disclosure can be implemented, in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases, it will be recognized that references to the "invention" will refer to subject matter recited in one or more, but not necessarily all, of the claims.

Various terms as used herein are shown below. To the extent a term used in a claim is not defined below, it should be given the broadest definition persons in the pertinent art have given that term as reflected in printed publications and issued patents at the time of filing.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding, that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

The present disclosure provides for an efficient and an end-to-end solution for achieving MU-MIMO transmission, by providing a flexible framework for the selection of channel decomposition techniques, and significantly reduce computation complexity by limiting the number of prospective MU-MIMO candidates. In addition, the solution also includes quality of service priority while selecting MU-MIMO candidate list. The present disclosure proposes a user selection criterion for MU-MIMO transmission in 5G systems that reduces the overall number of MU-MIMO candidate list. The MU-MIMO candidate list is also sorted based on a utility function which is computed for multi-dimensional user metric.

Functional Descriptions of System and Sub-System

FIG. 1A illustrates an exemplary network architecture in which or with which the system of the present disclosure can be implemented, in accordance with an embodiment of the present disclosure. Referring to FIG. 1A that illustrates an exemplary network architecture (100) in which or with which a system (109) for facilitating improved resources sharing of the present disclosure can be implemented, in accordance with an embodiment of the present disclosure. As illustrated in FIG. 1A, by way of example but not limitation, the exemplary architecture (100) may include a user (101) associated with a user computing device (102) (also referred to as user device (102) or user equipment (102), operatively coupled to a communication network (105) (also referred to as the core network (105) herein).

In an embodiment, the system (109) may further be operatively coupled to a second computing device (111) (also referred to as a scheduler (111). The scheduler (111) may be configured to determine a user traffic data queued in a data network (120). The user device (101) may be further operatively coupled to the scheduler (111) via any or a combination of one or more multi-input multi output (MIMO) base stations (104), one or more packet gateway nodes (NG1, NG2 . . . NGN) and the scheduler (111). The MIMO base stations can be single user (SU) MIMO or multi user (MU) MIMO. In radio, multi-user MIMO (MU-MIMO) is a set of advanced multiple-input and multiple-output, technologies where the available antennas are spread over a multitude of independent access points and independent radio terminals—each having one or multiple antennas.

In multi-user (MU) MIMO base stations, the spatial degrees of freedom offered by multiple antennas can be exploited to enhance the overall system capacity by scheduling multiple users to simultaneously share the spatial channel. This can be achieved when the transmitter is aware of the channel state information (CSIT) and applies the appropriate precoders to maximize the signal at the UE.

Figure 1B:
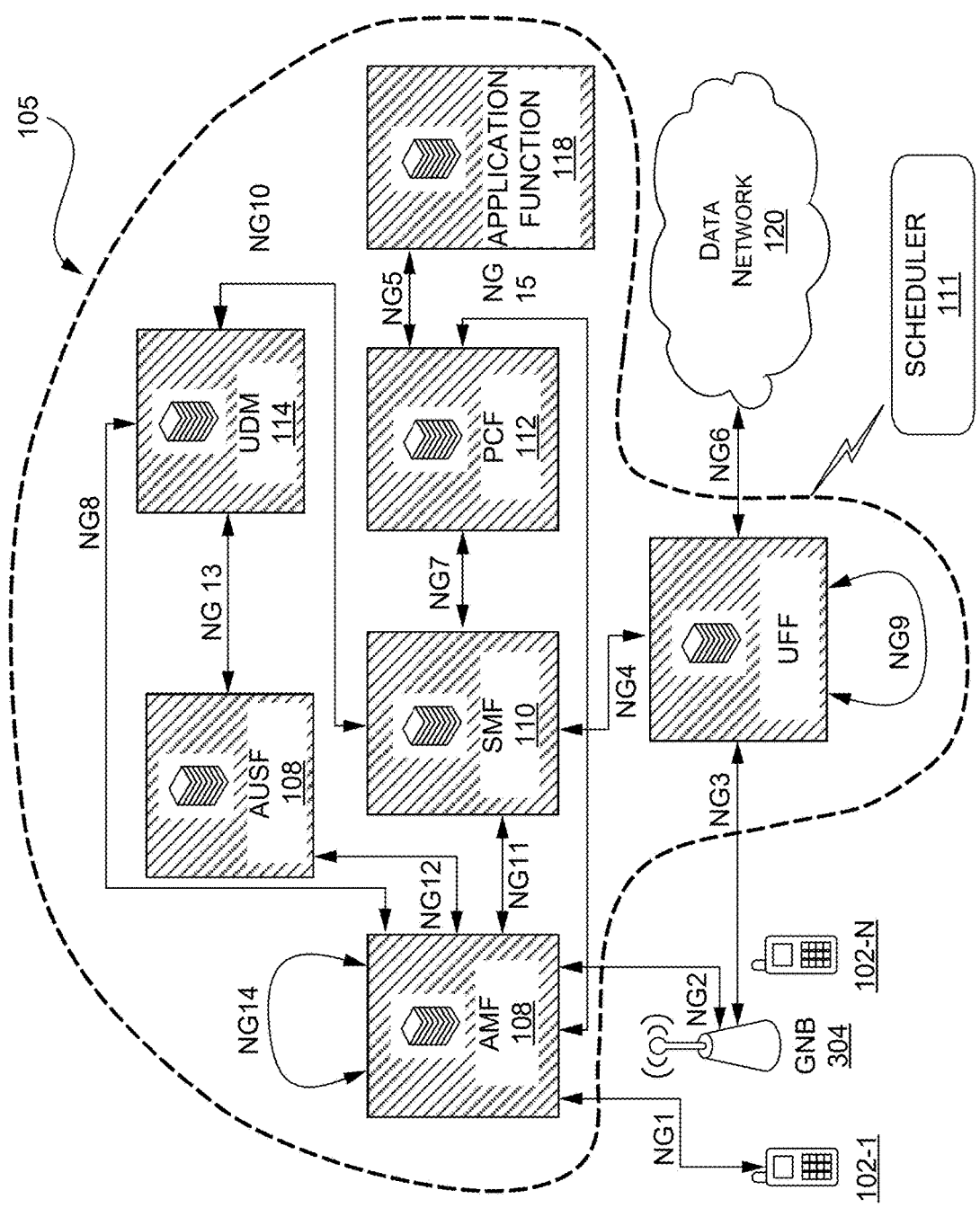
FIG. 1B illustrates a detailed example of 5G Network Deployment wireless communication system with reference to FIG. 1A, in which or with which the system of the present disclosure can be implemented, in accordance with an embodiment of the present disclosure.

FIG. 1B illustrates an exemplary network architecture in which or with which the system of the present disclosure can be implemented, in accordance with an embodiment of the present disclosure. As illustrated, in an aspect, the MIMO base station (104) (also referred to as gNB (104)) may provide a user plane (122) and a control plane (124) associated with the core network (105). The core network may be a 4G/5G/6G and other future core networks. In an exemplary embodiment, the user plane can be but not limited to a 5G New Radio's user plane and the base station can be but not limited to a 5G base station. The gNBs may be connected by means of a network or packet gateway (NG) interfaces (NG1, NG2 . . . NG15) to the 5GC, more specifically to an Access and Mobility Management Function (106) (AMF 106) by means of the NG2 interface (NG-Control) interface and to a User Plane Function (118) (UPF 118) by means of the NG3 (NG-User) interface. The network architecture (100) may further include an authentication server function (108) (AUSF 108), a user data management (114) (UDM 114), a session management function (110) (SMF 110), a policy control function (112) (PCF 112) and an application function module (116).

In an embodiment, the system (109) may receive from the one or more MIMO base stations, one or more data packets pertaining to parameters associated with one or more resources that require allocation in the wireless network to the one or more user equipment getting registered with the system through the respective packet gateway node. The system (109) may then be configured to extract a first set of attributes from the one or more data packets, the first set of attributes pertaining to one or more services associated with the one or more resources and also extract a second set of attributes from the scheduler (111), the second set of attributes pertaining to the user traffic data queued in the system associated with one or more services. The system (109) can further extract a third set of attributes from a database operatively coupled to a centralized server (113), the third set of attributes pertaining to one or more priority services that gain precedence over one or more services, wherein the centralized server is further operatively coupled to the system (109). The system (109), based the extracted first, second and third set of attributes, can determine a service priority list and then categorize, each user traffic data queue based on the service priority list. Furthermore, the system (109) can calculate, a user priority metric for each user traffic data queue based on the categorized user traffic data queue. Based on the calculated user priority metric, the system (109) can then determine a number of UEs to be allocated with a predefined service. The system (109) may be configured to maintain separate queues for the one or more services. The one or more services can include but not limited to, retransmission Queues, signalling radio bearer (SRB) Queues, Voice over New radio (VoNR) Queues, Guaranteed Bit Rate (GBR) Queues and Non-Guaranteed Bit Rate (Non-GBR) Queues.

In another embodiment, the system can extract one or more Channel Quality Indicator (CQI) and one or more resource block (RB) constraints from one or more MU-MIMO transmission channels and, apply the one or more Channel Quality Indicator (CQI) and the one or more resource block (RB) constraints to determine whether the determined number of UEs to be allocated are for a single user (SU)-MIMO base station or a multi-user (MU) MIMO base station.

In an embodiment, the system may be equipped with a MU-MIMO grid module that can further determine a number of candidate UEs for the MU-MIMO base station based on the number of UEs allocated to MU-MIMO base station. A MU-MIMO candidate pairing module may determine one or more resource blocks (RB) and one or more layers required for each candidate UE for the MU-MIMO base station transmission.

To achieve capacity maximization using MU-MIMO transmission—perfect knowledge of the channel is required at the transmitter. For the purpose of channel estimation in 5G systems, there is CSI-RS for the downlink (DL) channel estimation and SRS for the uplink (UL) channel estimation respectively. In an embodiment, the system can receive one or more Sounding Reference Signal (SRS) resources from the one or more MIMO base stations (104) for each candidate UE, extract one or more configured parameters associated with the one or more SRS resources and, based on the one or more configured parameters, estimate one or more channel coefficients for each candidate UE for MU-MIMO transmission.

Two main reference signals CSI and SRS—which are detailed in the 5G specification are summarized below.

Channel State Information and relevant parameters: CSI (Channel State Information) is used to estimate the DL channel between the gNB and the UE. For this procedure, gNB sends CSI reference signal from multiple configured CSI-RS ports—upon receiving the reference signal—UE estimates channel coefficients and derives, precoder matric index corresponds to an index in the configured codebook. Additionally, a consolidated Channel State Information (CSI) report is sent to the gNB. The CSI report constitutes of Channel Quality Indicator (CQI), Precoding Matrix Index (PMI), Rank Indicators (RI), Layer Indicator (LI) and L1-Reference Signal Received Power (RSRP).

The CSI Configuration Parameters may include the following
1. Report configuration
   i. Report Quantity
2. Resource configuration
3. Codebook Sounding Reference Signal (SRS) and Its relevant parameters: To estimate uplink channel, in a way of example and not as a limitation a pilot Sounding Reference Signal (SRS) is used by the receiving gNB to capture the channel coefficients for the UL channel. In another embodiment, the system (109) can compute a precoder based on the one or more channel coefficients. The precoder can be configured to determine an orthogonality basis for each candidate UE, mitigate interference from one or more co-scheduled candidate UEs associated with each said candidate UE, and, avoid Inter-layer interference in the one or more co-scheduled candidate UEs associated with each said candidate UE. In a way of example and not as a limitation, the system uses the channel matrix to compute an uplink precoder. The system can determine the closest precoder from the table 6.3.1.5-7 of 38.211 v15.5 to that of the measured UL precoder and reports the same to the UE. we assume channel reciprocity $H_{DL}=H_{UL}^T$. User pairing is based on the orthogonal precoders computed by the UE.

In an embodiment, the database can store one or more operational parameters and one or more default configuration parameters of the system.

In yet another embodiment, the system (109), depending on a geographical deployment area, can accept the default configuration parameters of the system.

In an exemplary embodiment, the functions for Radio Resource control (RRC (109)) module (also referred to as radio resource management) may include: Radio Bearer Control, Radio Admission Control, Connection Mobility Control, Dynamic allocation of resources to UEs in both uplink and downlink (scheduling); IP header compression, encryption and integrity protection of data; Selection of an AMF at UE attachment when no routing to an AMF can be determined from the information provided by the UE; Routing of User Plane data towards UPF(s); Routing of Control Plane information towards AMF; Connection setup and release; Scheduling and transmission of paging messages; Scheduling and transmission of system broadcast information (originated from the AMF or OAM); Measurement and measurement reporting configuration for mobility and scheduling; Transport level packet marking in the uplink; Session Management; Support of Network Slicing; QoS Flow management and mapping to data radio bearers; Support of UEs in RRC_INACTIVE state; Distribution function for NAS messages; Radio access network sharing; Dual Connectivity; Tight interworking between NR and E-UTRA but not limited to the like.

The AMF (106) may host the following main functions: NAS signalling termination; NAS signalling security; AS Security control; Inter CN node signalling for mobility between 3GPP access networks; Idle mode UE Reachability (including control and execution of paging retransmission); Registration Area management; Support of intra-system and inter-system mobility; Access Authentication; Access Authorization including check of roaming rights; Mobility management control (subscription and policies); Support of Network Slicing; SMF selection but not limited to the like.

The UPF (118) may host the following main functions: Anchor point for Intra-/Inter-RAT mobility (when applicable); External PDU session point of interconnect to Data Network; Packet routing and forwarding; Packet inspection and User plane part of Policy rule enforcement; Traffic usage reporting; Uplink classifier to support routing traffic flows to a data network; Branching point to support multi-homed PDU session; QoS handling for user plane, e.g. packet filtering, gating, UL/DL rate enforcement; Uplink Traffic verification (SDF to QoS flow mapping); Downlink packet buffering and downlink data notification triggering but not limited to the like.

The SMF (110) may host the following main functions: Session Management; UE IP address allocation and management; Selection and control of UP function; Configures traffic steering at UPF to route traffic to proper destination; Control part of policy enforcement and QoS; Downlink Data Notification but not limited to the like.

The PCF (112) may host the following main functions: The 5G PCF performs the same function as the PCRF in 4G networks; Provides policy rules for control plane functions. This includes network slicing, roaming and mobility management; Accesses subscription information for policy decisions taken by the UDR; Supports the new 5G QoS policy and charging control functions but not limited to the like.

The AUSF (108) may host the following main functions: The AUSF performs the authentication function of 4G HSS; Implements the EAP authentication server; Stores keys but not limited to the like.

The UDM (114) may host the following main functions: The UDM performs parts of the 4G HSS function; Generation of Authentication and Key Agreement (AKA) credentials; User identification; Access authorization; Subscription management; but not limited to the like.

'The AF (116) may host the following main functions: Application influence on traffic routing; Accessing Network Exposure Function; Interaction with the policy framework for policy control but not limited to the like.

Figure 1C:
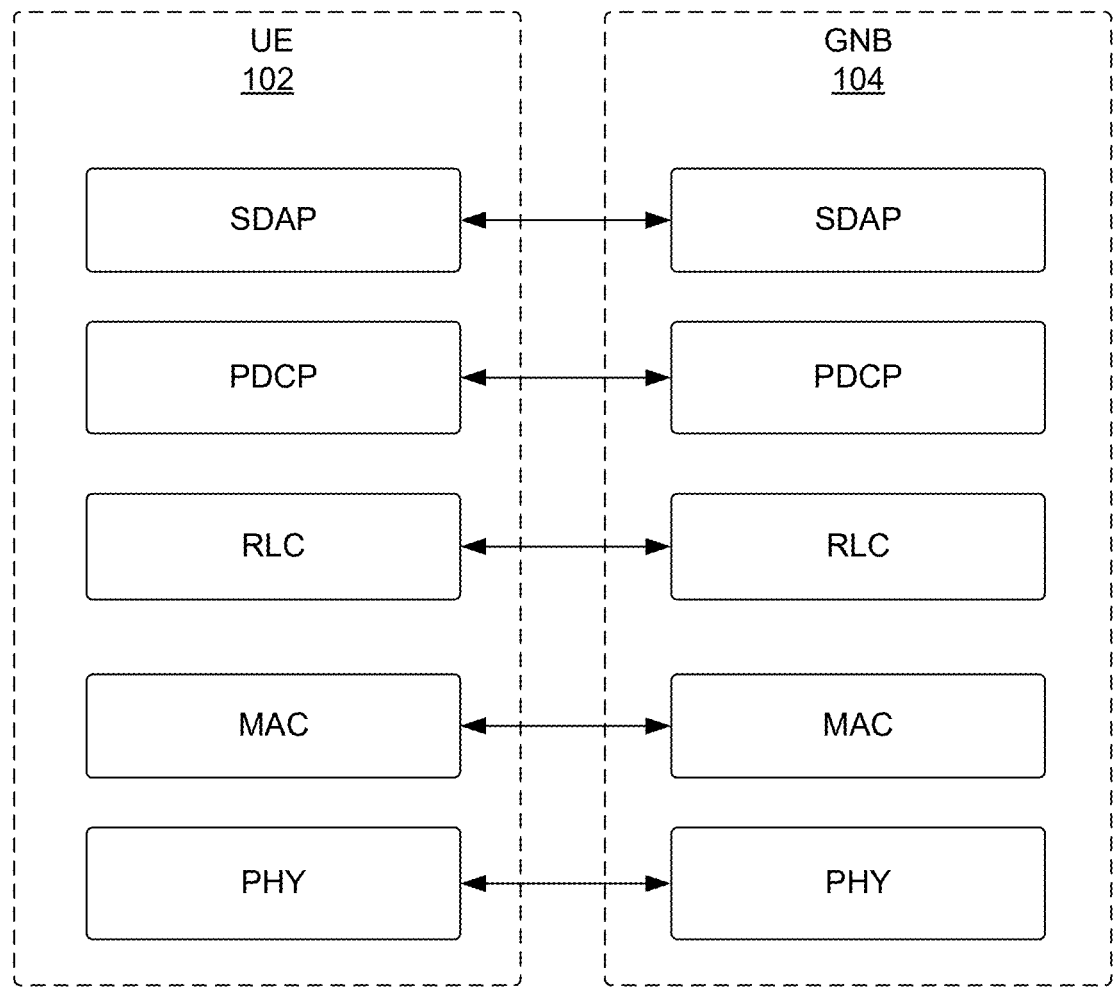
FIG. 1C illustrates a diagram for User Plane Protocol Stack at User Equipment (UE) and gNB.

FIG. 1C illustrates a diagram for User Plane Protocol Stack at User Equipment (UE) and gNB. The detailed user plane protocol stack for the gNB shows Service Data Adaptation Protocol (SDAP), Packet Data Convergence Protocol (PDCP), Radio link control (RLC) and medium access control (MAC) and physical (PHY) sub-layers getting terminated in gNB on the network side as well as in User equipment (UE) side.

The PHY hosts the following main functions
Physical-layer processing for physical downlink shared channel (PDSCH)
Physical-layer processing for Physical downlink control channels (PDCCH)
Physical-layer processing for Synchronization signal and PBCH (SSB)
Physical-layer processing for physical uplink shared channel (PUSCH)
Physical-layer processing for Physical uplink control channel (PUCCH)

The MAC hosts the following main functions
Mapping between logical channels and transport channels;
Multiplexing/demultiplexing of MAC SDUs belonging to one or different logical channels into/from transport blocks (TB) delivered to/from the physical layer on transport channels;
Scheduling information reporting;
Error correction through HARQ (one HARQ entity per cell in case of CA);
Priority handling between UEs by means of dynamic scheduling;
Priority handling between logical channels of one UE by means of logical channel prioritisation;
Padding The RLC hosts the following main functions
Transfer of upper layer PDUs;
Sequence numbering independent of the one in PDCP (UM and AM);
Error Correction through ARQ (AM only);
Segmentation (AM and UM) and re-segmentation (AM only) of RLC SDUs;
Reassembly of SDU (AM and UM);
Duplicate Detection (AM only);
RLC SDU discard (AM and UM);
RLC re-establishment;
Protocol error detection (AM only)

The PDCP hosts the following main functions
Sequence Numbering;
Header compression and decompression: ROHC only;
Transfer of user data;
Reordering and duplicate detection;
in-order delivery;
PDCP PDU routing (in case of split bearers);
Retransmission of PDCP SDUs;
Ciphering, deciphering and integrity protection;
PDCP SDU discard;
PDCP re-establishment and data recovery for RLC AM;
PDCP status reporting for RLC AM;
Duplication of PDCP PDUs and duplicate discard indication to lower layers The SDAP hosts the following main functions
Mapping between a QoS flow and a data radio bearer;
Marking QoS flow ID (QFI) in both DL and UL packets.

Figure 2:
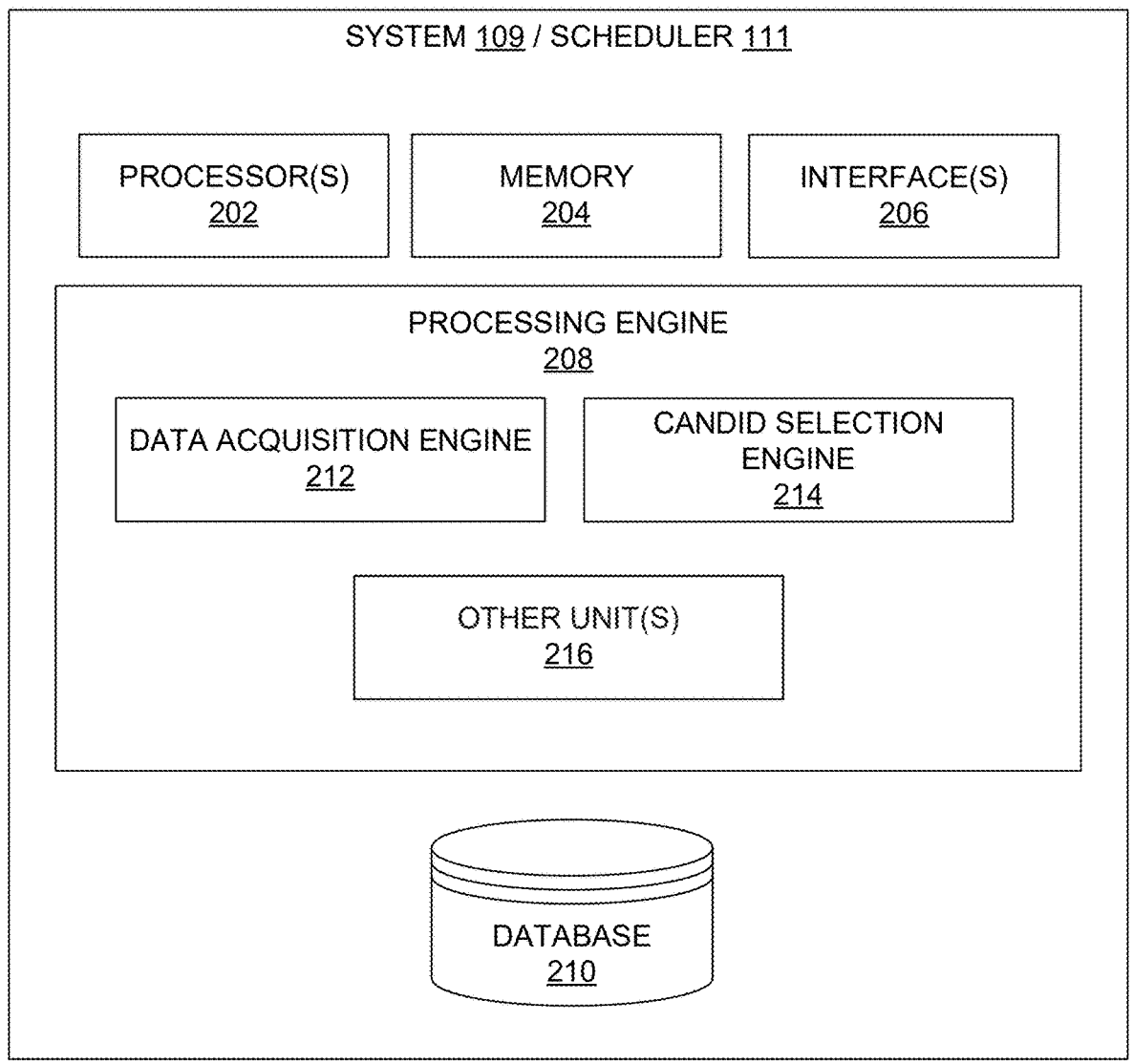
FIG. 2 illustrates an exemplary representation (200) of system, in accordance with an embodiment of the present disclosure.

FIG. 2 illustrates an exemplary representation of the proposed system (109), in accordance with an embodiment of the present disclosure. In an aspect, the system (109) may include one or more processor(s) (202). The one or more processor(s) (202) may be implemented as one or more microprocessors, microcomputers, microcontrollers, edge or fog microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the system (109). The memory (204) may store one or more computer-readable instructions or routines in a non-transitory computer readable storage medium, which may be fetched and executed to create or share data packets over a network service. The memory (204) may comprise any non-transitory storage device including, for example, volatile memory such as RAM, or non-volatile memory such as EPROM, flash memory, and the like.

In an embodiment, the system (109) may include an interface(s) 206. The interface(s) (206) may comprise a variety of interfaces, for example, interfaces for data input and output devices, referred to as I/O devices, storage devices, and the like. The interface(s) (206) may facilitate communication of the system (109). The interface(s) (206) may also provide a communication pathway for one or more components of the system (109). Examples of such components include, but are not limited to, processing unit/engine(s) (208) and a database (210).

The processing unit/engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (109) may comprise the machine-readable storage medium storing the instructions and the processing resource to execute the instructions, or the machine-readable storage medium may be separate but accessible to the system (109) and the processing resource. In other examples, the processing engine(s) (208) may be implemented by electronic circuitry.

The processing engine (208) may include one or more engines selected from any of a data acquisition engine (212), candidate calculation engine (214), and other engines (216). The processing engine (208) may further edge based micro service event processing but not limited to the like.

Figure 3:
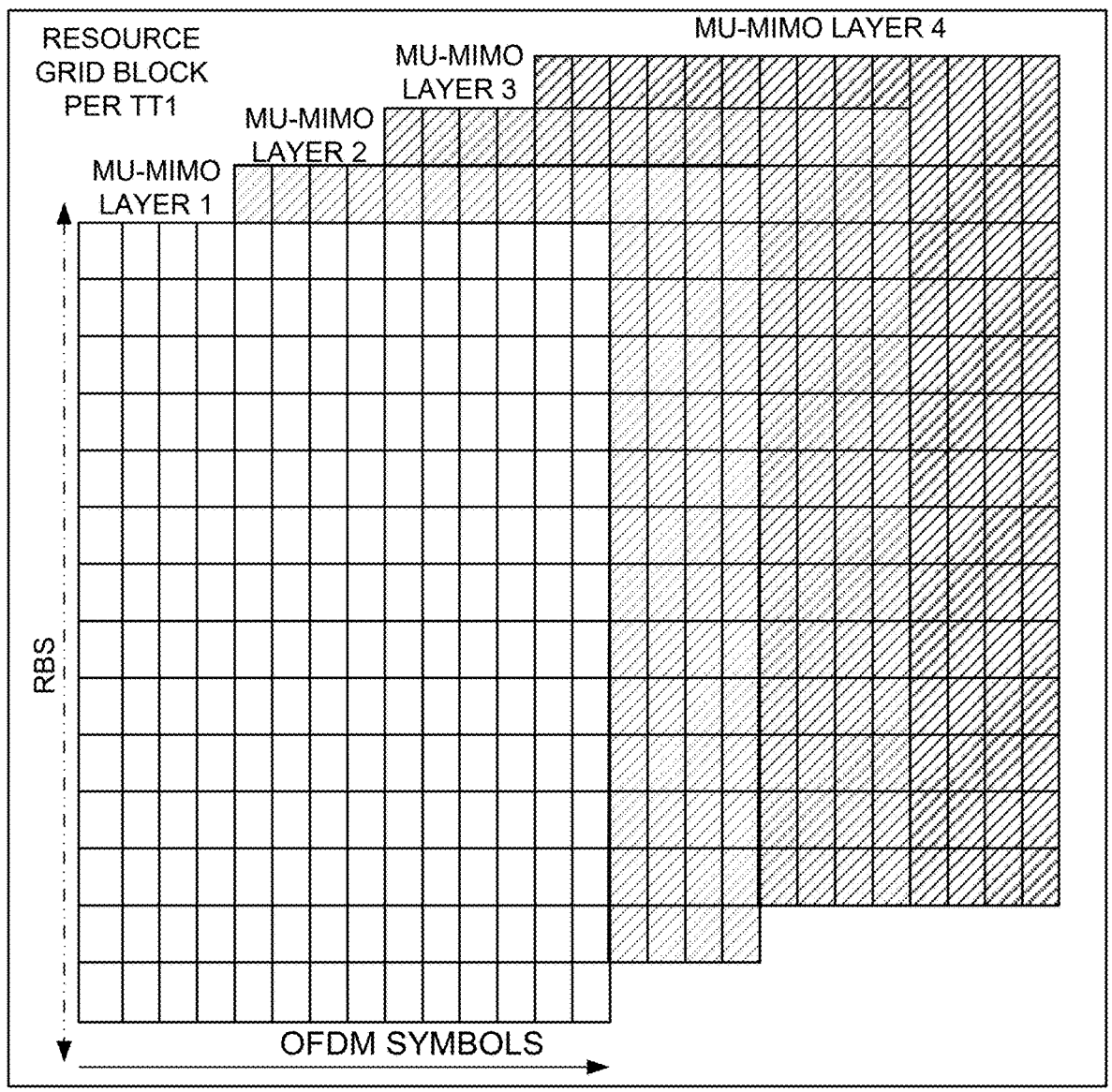
FIG. 3 is an example of MU-MIMO Resource Grid, in accordance with an embodiment of the present disclosure.

In the example below for MU-MIMO implementation, a visual representation showing each UE supporting a single and four orthogonal UEs are paired at any time is depicted in FIG. 3. Additionally, the maximum no. of users/TTI is fixed at 8.

Consider a MU-MIMO configuration—

| | |
|---|---|
| No. of Users/TTI | 8 |
| No. of MU-MIMO layers | 4 |
| No. of Layers per UE | 1 |
| Total RBs for MU-MIMO | 100 |

Based on the Orthogonality of the Users we have the following users paired for MU-MIMO transmission

| One scheduling instance is allocation of 50% of Total RBs | |
|---|---|
| MU-MIMO Candidates {1 3 8 9} | 1-50 of RBs |

| One scheduling instance is allocation of 50% of Total RBs | |
|---|---|
| MU-MIMO Candidates {2 4 5 7} | 51-100 of RBs |

Figure 4:
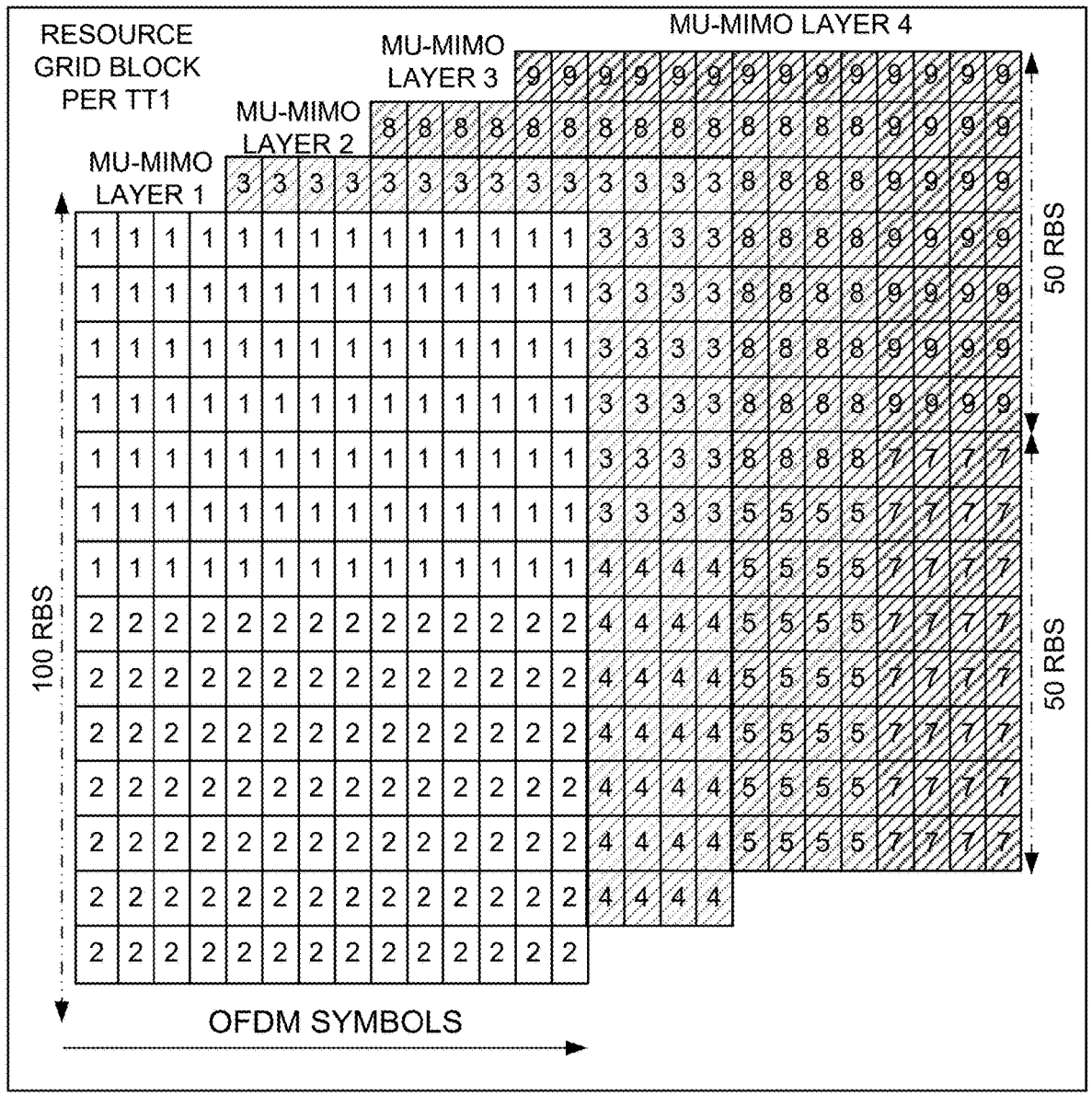
FIG. 4 is an example of MU-MIMO candidate pair (Pictorial Depiction), in accordance with an embodiment of the present disclosure.

FIG. 4 illustrates a scenario where each of the UE supports a single layer transmission and at least four orthogonal UE's may be paired to form MU-MIMO candidates. It further shows how UEs are distributed on MU-MIMO resource grid.

Figure 5:
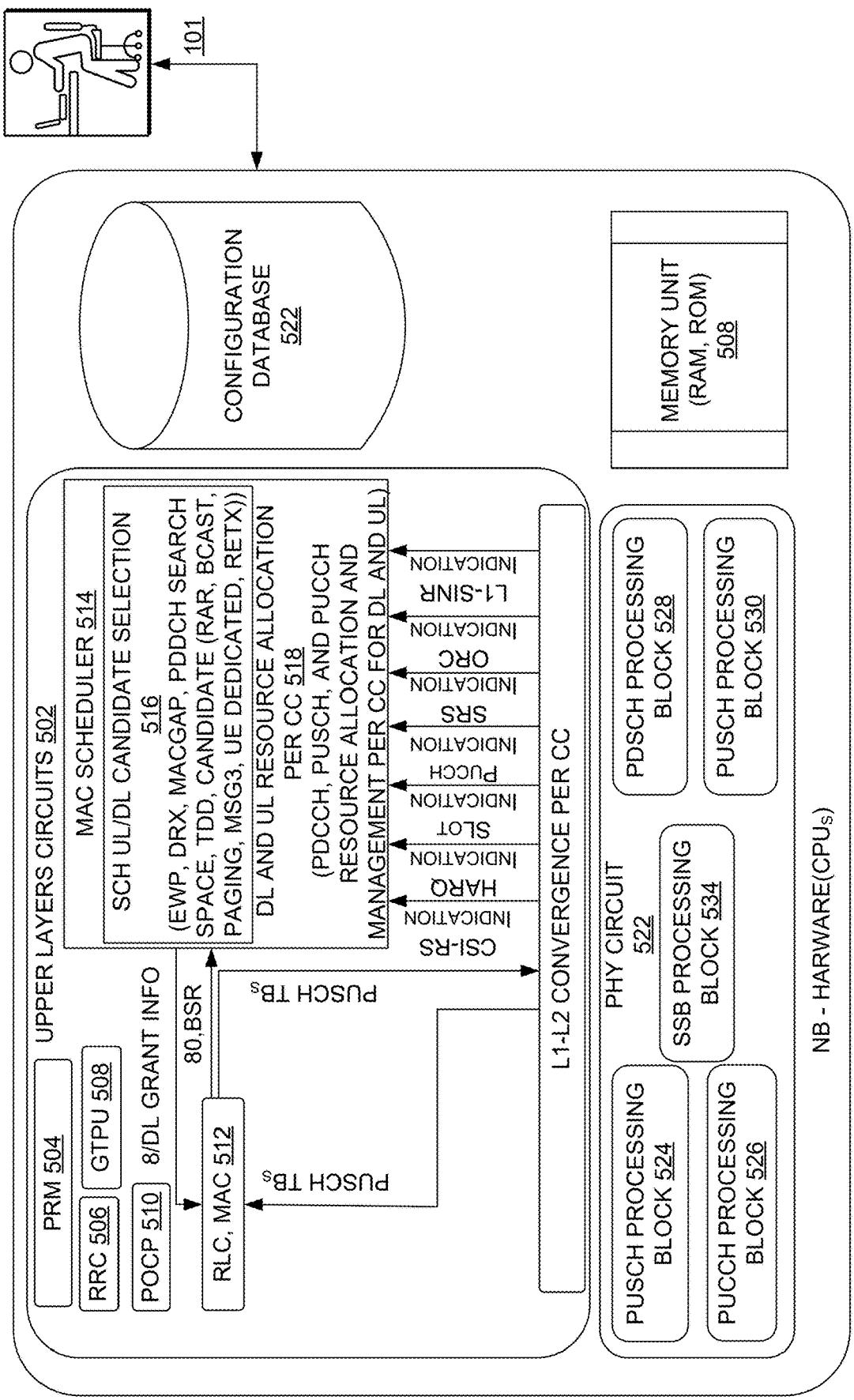
FIG. 5 is another embodiment which indicates the current gNB System with different components.

FIG. 5 gives a typical reference implementation level gNB system (500). As seen in FIG. 5, it has multiple components over the hardware including the configuration database and memory unit(s). In an Upper Layer circuit (502), there is a MAC scheduler (514) which is responsible for candidate selection (516) and resource allocation (518). The Upper layer circuit (502) further includes a radio resource management (RRM) (504), an RLC/MAC (512), a configuration database (522) and an L1-L2 convergence per CC (520). The RRM (504) further includes an RRC (506), and an eGTPU (508), and a PDCP (510). The current gNB system (500) also includes a PHY circuit (522) that includes a PDCCH processing block (524), a PUCCH processing block (526), a PDSCH processing block (528), a PUSCH processing block (530) and an SSB processing block (534). The current gNB system (500) also includes a memory unit (532) that can be RAM or ROM.

Figure 6:
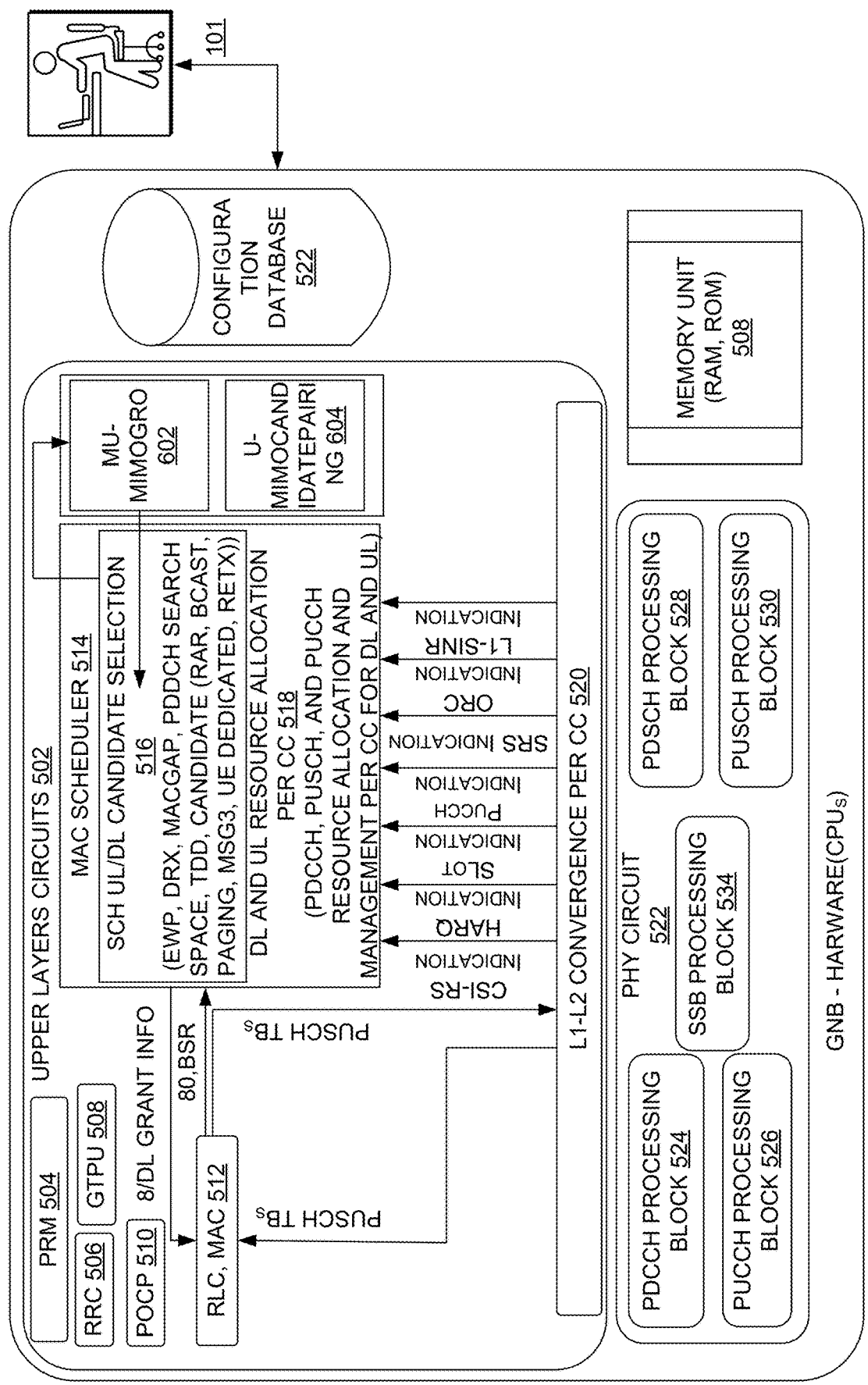
FIG. 6 is another embodiment which indicates the proposed gNB System with different components.

FIG. 6 is another embodiment which indicates the proposed gNB System with different components. The proposed gNB system (600) also includes an Upper Layer circuit (502), and a MAC scheduler (514) which is responsible for candidate selection (516) and resource allocation (518). The Upper layer circuit (502) further includes a radio resource management (RRM) (504), an RLC/MAC (512), a configuration database (522) and an L1-L2 convergence per CC (520). The RRM (504) further includes an RRC (506), and an eGTPU (508), and a PDCP (510). The current gNB system (500) also includes a PHY circuit (522) that includes a PDCCH processing block (524), a PUCCH processing block (526), a PDSCH processing block (528), a PUSCH processing block (530) and an SSB processing block (534). The current gNB system (500) also includes a memory unit (532) that can be RAM or ROM. The candidate selection module (516) in the MAC scheduler (514) sends the selected candidates to a MU-MIMO Grid (602) which is further sent to MU-MIMO candidate pairing module (604) that sends the paired candidates to the resource allocation module (518). The main task of the scheduler is to schedule resources (symbols/sub-carriers, transmission powers and users) in the cellular eco system. There are various independent and dependent parameters that influences the decision-making policies of the scheduler. Additionally, an MU-MIMO scheduler exploits spatial domain and schedules multiple users in same frequency and time domain, with spatial separation.

Figure 7:
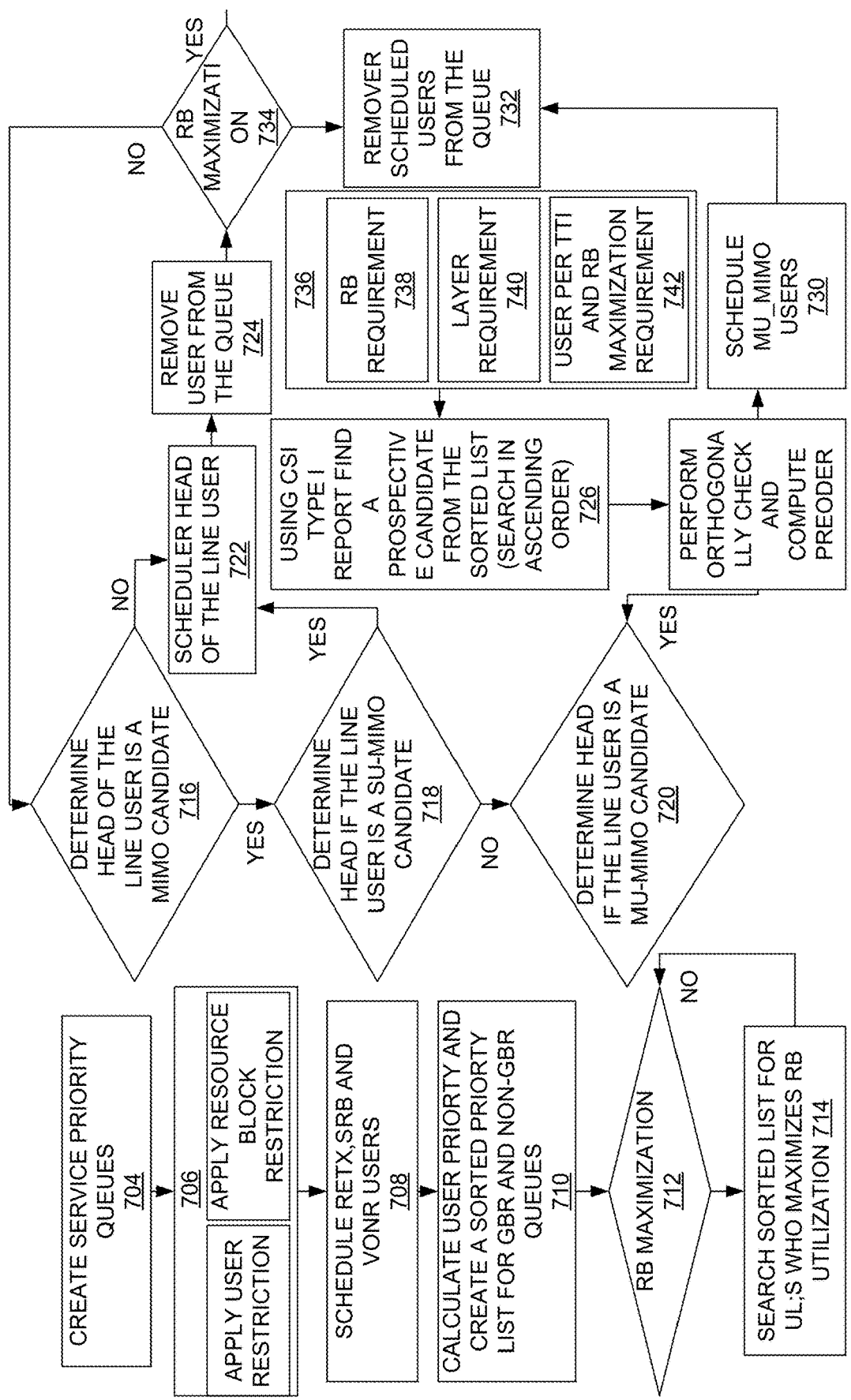
FIG. 7 is another embodiment which indicates the proposed flow diagram for Proposed MU-MIMO and User Pairing method.

In one of an exemplary embodiment, the flowchart (700) for determining user selection, precoder design for MU-MIMO transmissions is provided in FIG. 7 as below: At 702, the method may include the step of creating service priority queues. At 704, the method may include the step of applying user restriction and at 706, applying resource block (RB) restriction. For example, an active user Set may be maintained which is a list of users whose buffer occupancy is non-zero is considered. Each user may have more than one service traffic. For instance, at 708, the method may include scheduling a user with VoNR traffic that can also have GBR or Non-GBR traffic. At 710, and 712, the maximum number of users to be scheduled for each service queue may be determined for both UL/DL per slot. the maximum number of users is a RRM configurable parameter that can be given as
   i. maxRetxUsersPerSlot
   ii. maxSRBUsersPerSlot
   iii. maxVoNRUsersPerSlot
   iv. maxGBRUsersPerSlot
   v. maxNonGBRUsersPerSlot The maximum number of DL/UL MU-MIMO layers per slot is defined.

The maximum number of DL/UL SU-MIMO layers per slot is defined.

RB allocation for GBR and Non-GBR Candidates may include
   i. Static Allocation: In this approach we would define a max. number of RBs for each service per user.
   ii. On Demand Allocation: In this approach there is no restriction on number of RBs allocated per service or per UE.
   iii. Alternatively, we could proportionally allocate RBs for the defined number of UEs/TTI In an embodiment, the method may include at 714, the step of searching the sorted UEs that maximizes RB allocation. At 716, the method may include the step of checking if the head user is a MIMO candidate, if it is, at 718, the method may include the step of determining if the MIMO candidate is a SU-MIMO candidate. If it is not, at 720, the method may include the step of determining if the MIMO candidate is a MU-MIMO candidate. If yes, at 726, using a CSI type 1 report, the method may include the step of finding a prospective candidate from the sorted list and at 728, the method may include the step of performing orthogonality check and computing precoder. At 730, the method may further include the step of scheduling MU-MIMO users, and at 732, removing scheduled users from the queue. Then at 734, the method may include the step of checking RB maximization for the queue. If RB maximization is reached, then the method goes back to step 714. If RB maximization is not reached, then the method goes to step 716. If the determined candidate is not a MIMO candidate, the method may include at 722, the step of scheduling head of the line user, and at 724, the step of removing user from the queue that goes to step 734 of checking RB maximization for the queue.

Figure 8:
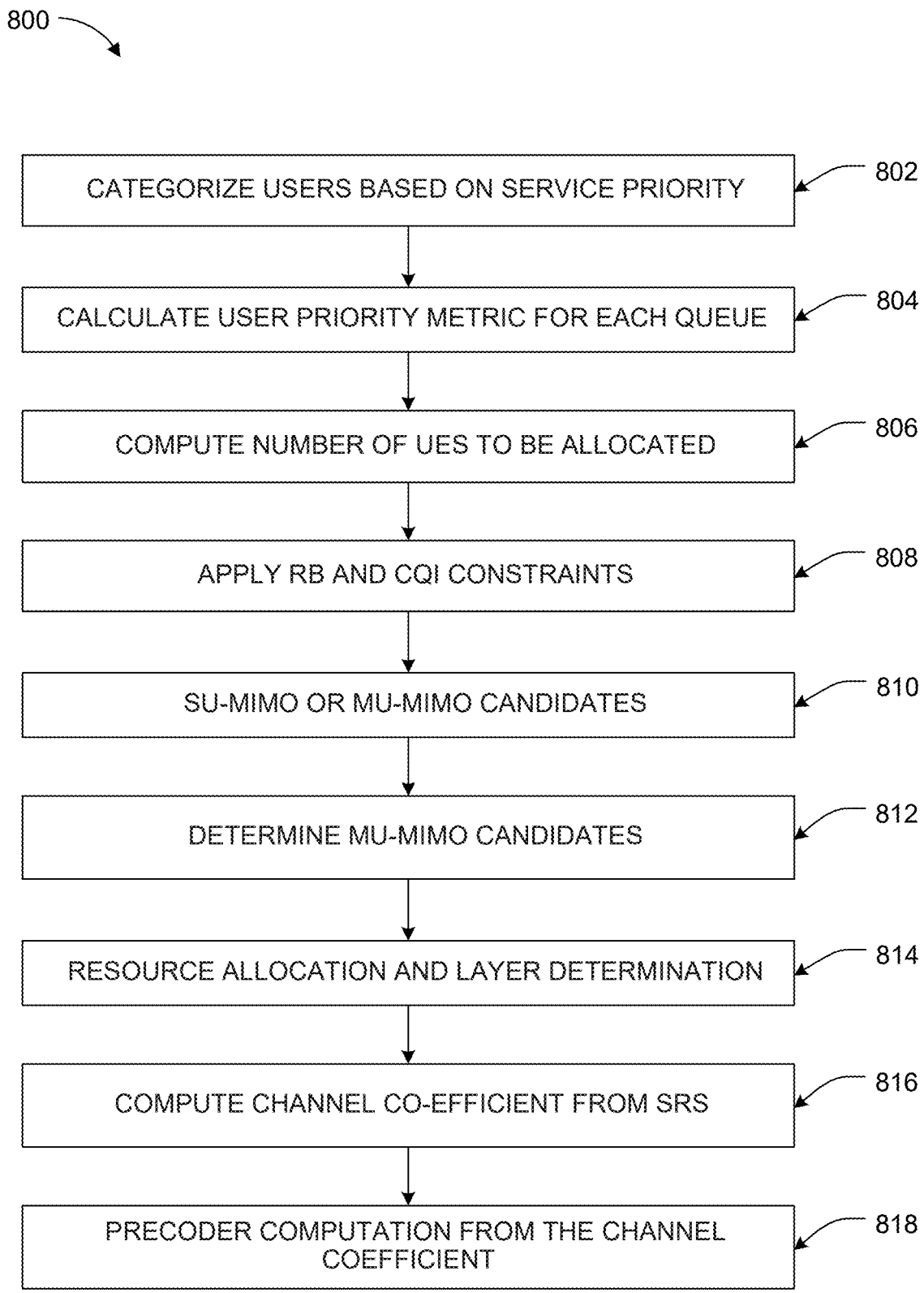
FIG. 8 is another embodiment which indicates the proposed steps for Proposed MU-MIMO and User Pairing method.

FIG. 8 is another embodiment which indicates the proposed steps for Proposed MU-MIMO and User Pairing method. The method may include at 802, categorizing users based on Service Priority. In an embodiment, to ensure the Service Priority the gNB system will maintain separate queues for the following services as described below such as Retransmission Queues, SRB Queues, VoNR Queues, Guaranteed Bit Rate (GBR) Queues, Non-Guaranteed Bit Rate (Non-GBR) Queues and the like. In another embodiment, a user can be part of multiple queues.

At 804, the method may include the step of calculating user priority metric for each queue. The short-listed user list is then sorted as per the utility function metric computed for each user. The MU-MIMO utility function for user i is defined as $U_i$ where $U_i = f(QoS, BO, PDB, \text{Channel}, CSI, \text{SystemKPIs})$ In an embodiment, a QoS Priority Level may be determined by providing priority in scheduling resources among QoS Flows and used to differentiate between QoS Flows of the same UE, and it shall be used to differentiate between QoS Flows from different UEs. Once all QoS requirements up to GFBR are fulfilled for all the GBR QoS flows, the Priority level may be used to differentiate between GBR QoS Flows and non-GBR QoS flows in an implementation specific manner. Lowest Priority level value equals the highest priority. In an embodiment, a Buffer Status using Buffer occupancy and Buffer Overflow may be determined. For the DL transmission, buffer occupancy of each user at the gNB can be considered as part of the MU-MIMO metric.

In an embodiment, a Packet Delay Budget (PDB) defines an upper bound for the time that a packet may be delayed between UE and the UPF that terminates the N6 interface. For GBR QoS Flows using the Delay-critical resource type, a packet delayed more than PDB is counted as lost if the data burst is not exceeding the MDBV within the period of PDB and QoS Flows is not exceeding the GFBR. For GBR QoS flows with GBR resource type, the PDB shall be interpreted as maximum delay with a confidence level of 98% if the QoS flow is not exceeding the GFBR.

In an embodiment, a channel impairment can be captured using ACK/NACK received for the DL transmission.

In an embodiment, CSI parameters can be considered from the UE. The parameters in CSI reporting are: Wideband and subband CQI PMI: Wideband and subband PMI, Layer Indicator (LI), L1-RSRP System KPIs
   Jain's fairness Index for 'n' users can be calculated ri is the throughput of the ith connection, and n is the number of users Jain's fairness Index for 'n' users can be calculated ri is the throughput of the ith connection, an d n is the number of users
   Jain's Fairness index [Reference]

$$f(x_1, x_2, \ldots, x_n) = \frac{\left(\sum_{i=1}^{n} x_i\right)^2}{n \cdot \sum_{i=1}^{n} x_i^2}$$

Cell Throughput/Spectral Efficiency:
Cell Edge Throughput/Spectral Efficiency:

At 806, the method may include the step of computing number of UEs to be allocated.

For a given system Configuration (users PerTTI), we first determine the number of users that could be scheduled for this slot.

$\text{User}_{mimo}$
   =usersPerTTI
   −(Candidtes(Retransmissions)
   +Candidates(VoNR)
   +Candidates(SRB));

Additionally, Compute RBs remaining after allocation of retransmission, VoNR and SRB.

At 808, the method may include the step of applying RB and CQI Constraints
   a. For head user of the GBR queue check if the users CQI value is greater than $CQI_{threshold}$ and his RB requirement is greater than the minimum number of RBs ($\alpha_{RBs}$) required for MU-MIMO Candidacy.
      i. If the number of RBs is below $\alpha_{RBs}$ or/and CQI value is less than $CQI_{threshold}$, then that UE is not considered for MIMO candidacy but scheduled for the slot
      ii. $\text{User}_{mimo} = \text{User}_{mimo} - 1$;
      iii. RB requirement is computed from the buffer occupancy (BO) status and UE reported CQI value.

At 810, the method may include the step of checking for SU-MIMO or MU-MIMO Candidates Assuming the head user has passed the step-4, then the UE is considered for SU-MIMO or MU-MIMO candidacy.

If the head user can support SU-MIMO for maxDLsumimoLayers,

The user is scheduled as SU-MIMO.

Else

The candidate is selected for MU-MIMO.

End

At 812, the method may include the step of determining MU-MIMO Candidates using the following 1. Using CSI Type I report: In case the UE is configured to report the CSI-Type I. We define the head of the sorted list candidate as the primary candidate. With the primary candidates PMI as the reference, the sorted list would be further reduced to only include those UEs whose reported PMIs matrix are orthogonal with all the UEs in the list.

TABLE 1

An example for 8 PMI indices
PMI Index (1-8)

| 1 ⊥ 5 | 2 ⊥ 6 | 3 ⊥ 7 | 4 ⊥ 8 |
| --- | --- | --- | --- |

In the above example if the primary candidate is selected as 1, then all the users who reported PMI index as 5 are considered as prospective candidate for user pairing.

At 814, the method may include the step of determining Resource allocation and Layer applied by 1. Since scheduling two UEs whose RB requirements is different will not yield efficient results, we introduce the parameter $\delta_{RBs}$, which ensures the following condition, $(UE_{i\_head}^{RBs} - UE_j^{RBs}) < \delta_{RBs}$; where i_head≠j and i_head is the head UE.

2. Compute ideal number of RBs and layers that is used for the MU-MIMO transmission At 816, the method may include the step of computing channel co-efficient from SRS by The dimension of the channel coefficients may be given by [SRS_AVAILABLE_SYMBOL_NUM] [gNB_ANTENNA] [UE_ANTEENA_PORTS] [MAX_NUM_OF_PRB_IN_FULL_BAND]

At 818, the method may include the step of Precoder computation from the channel coefficient using:

For the selected users in step 7, compute precoder as stated below,

1. A two-stage precoding design is opted to find the orthogonality basis for the UEs selected above. Here first stage is formulated to mitigate 1. Interference from co-scheduled UEs and the second stage is used Inter-layer interference avoidance.

2. Two stage channel decomposition is required to be performed. Classically singular vector decomposition can be employed to find the orthogonal basis for the channel.

a. SVD will give us numerically accurate precoder but it could lead to computationally intensive task to find the precoder weights. So, we could employ a combination of SVD and QR decomposition strategies to find orthogonal basis for the first/second iteration, respectively.

i. First Iteration: Classically SVD is employed to find the orthogonal basis ii. Second iteration: we achieve QR decomposition with more stable household reflection method or computationally efficient Givens rotation for the second iteration.

Figure 9:
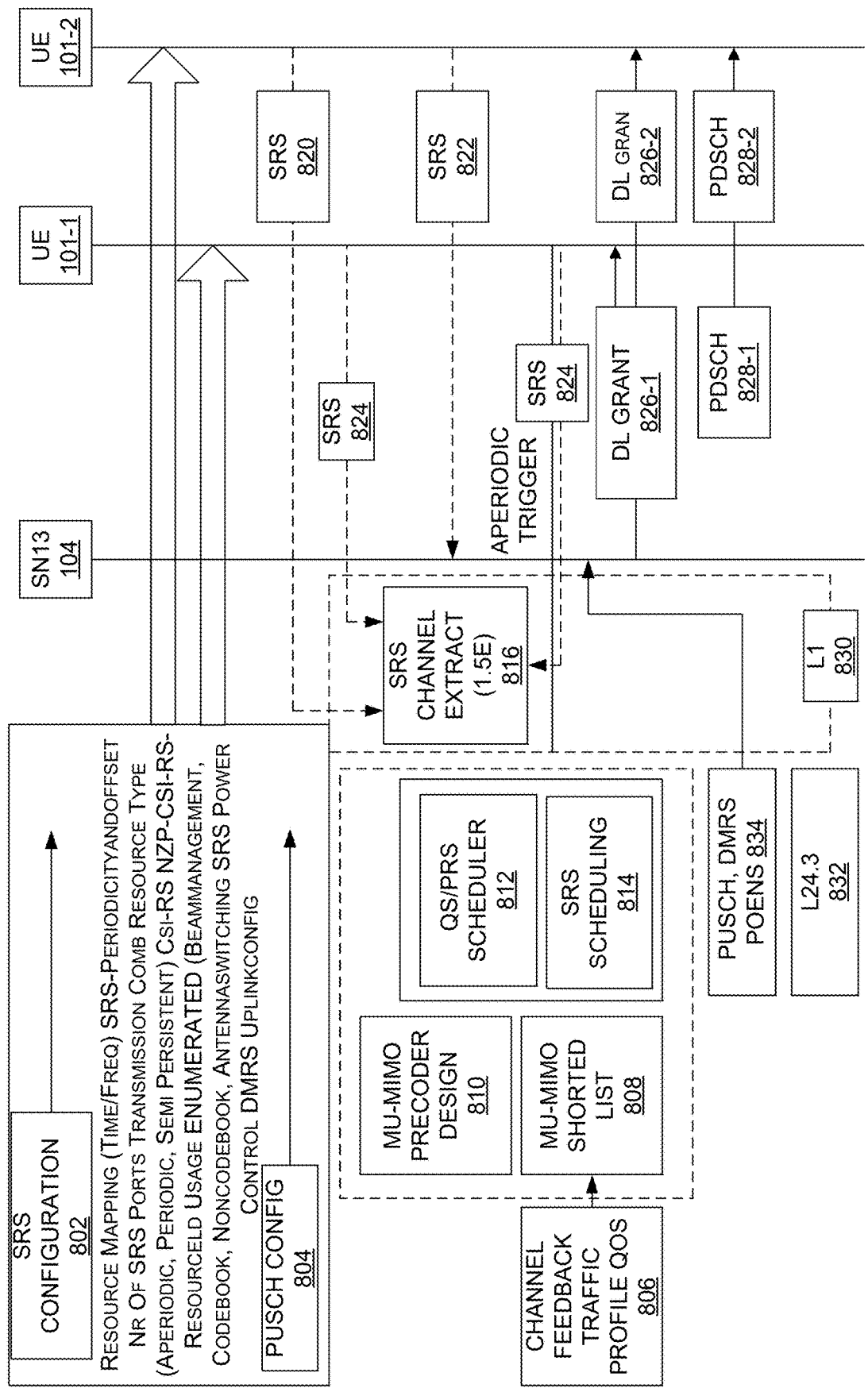
FIG. 9 is another embodiment which indicates the proposed diagram for Proposed resource allocation-DL MU-MIMO.

FIG. 9 is another embodiment which indicates the proposed diagram for Proposed resource allocation-DL MU-MIMO. A simple call flow for SRS based DL MU-MIMO is shown in FIG. 9. In this example, gNB (104) initially configures SRS resources and PUSCH to UE1 (101-1) and UE2 (101-2). Depending on the configured parameters defined in the SRS configuration via channel feedback traffic profile (906), MU-MIMO sorted list (908), QoS scheduler (912), an SRS scheduling (914) that goes through an L1 layer (930) having an SRS channel estimator (916). UE1 (101-1) and UE2 (101-2) transmits SRS on the configured ports (934) such as PUSCH, DMRS ports. Upon receiving the SRS signal from each UE, the gNB estimates the channel coefficients by DL MU-MIMO (930) via DL grant (926) and PDSCH (928).

Figure 10:
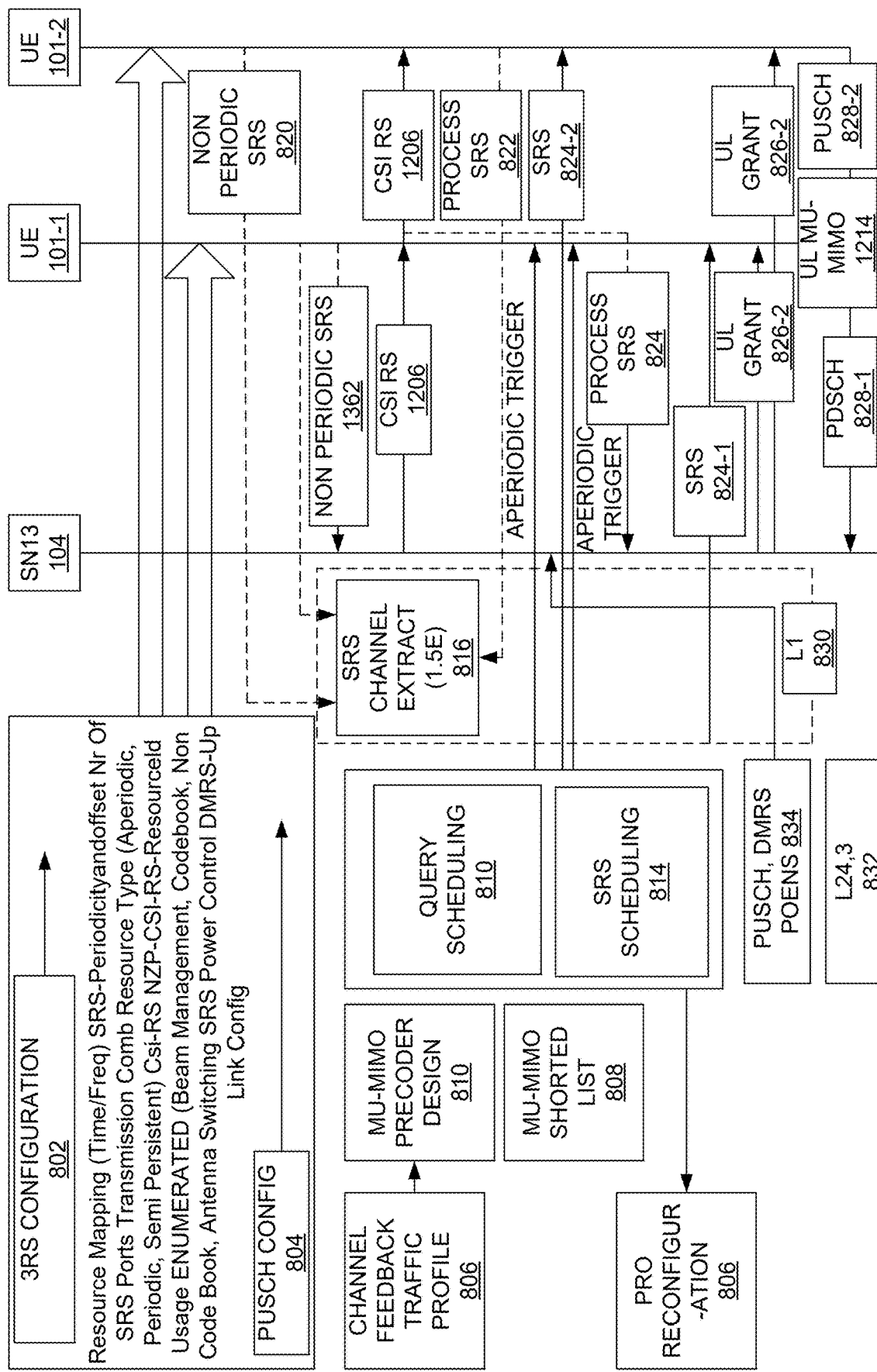
FIG. 10 is another embodiment which indicates the proposed diagram for Proposed resource allocation-UL MU-MIMO.

FIG. 10 is another embodiment which indicates the proposed diagram for Proposed resource allocation-UL MU-MIMO. A simple call flow for SRS based UL MU-MIMO is shown in FIG. 10.

In this example, gNB (104) initially configures SRS resources and PUSCH to UE1 (101-1) and UE2 (101-2). Depending on the configured parameters defined in the SRS configuration via channel feedback traffic profile (906), MU-MIMO sorted list (908), QoS scheduler (912), an SRS scheduling (914) that goes through an L1 layer (930) having an SRS channel estimator (916). UE1 (101-1) and UE2 (101-2) transmits SRS on the configured ports (934) such as PUSCH, DMRS ports. The SRS can be non-periodic SRS (1004) or non precoded SRS (1006) sent to the SRS channel estimator (916) through CSI RS (1008) and SRI (1012). The SRS channel estimator (916) further receives a precoded SRS through an aperiodic trigger to the UE (101). Upon receiving the SRS signal from each UE, the gNB estimates the channel coefficients by UL MU-MIMO (1014) via DL grant (926) and PDSCH (928).

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Present Disclosure

The present disclosure provides a system and a method that support end-to-end method to achieving MU-MIMO transmission.

The present disclosure provides a system and a method that provides improved MU-MIMO with respect to resource allocation mechanism without compromising on the user data-rate requirements.

The present disclosure provides a vide a system and a method that provides a design of low complexity solution.

The present disclosure provides a system and a method that compensates for channel uncertainties, eliminates intra layer interference for a UE and simultaneously mitigates interference from co-scheduled UEs.

We claim:

1. A system facilitating improved resource sharing in a distributed wireless communication system, said system comprising:
a scheduler operatively coupled to any or a combination of one or more Multi input multi output (MIMO) base stations, one or more packet gateway nodes (NG1, NG2. . . . NGN),
wherein, the one or more MIMO base stations, the one or more packet gateway nodes are communicatively coupled to one or more user equipment (UE) through a communication network,
wherein said scheduler comprises a processor that executes a set of executable instructions that are stored in a memory, upon which execution, the processor causes the scheduler to:
receive from the one or more MIMO base stations, one or more data packets pertaining to parameters associated with one or more resources that require allocation in the communication network to the one or more user equipment getting registered with the system through a respective packet gateway node;
extract a first set of attributes from the one or more data packets, the first set of attributes pertaining to one or more services associated with the one or more resources;
extract a second set of attributes, the second set of attributes pertaining to a user traffic data queued in the scheduler associated with one or more services;
extract a third set of attributes from a database operatively coupled to a centralized server, the third set of attributes pertaining to one or more priority services that gain precedence over one or more services, wherein the centralized server is further operatively coupled to the system;
determine, based the extracted first, second and third set of attributes a service priority list;
categorize, each user traffic data queue based on the service priority list;
calculate, a user priority metric for each user traffic data queue based on the categorized user traffic data queue;
based on the calculated user priority metric, determine a number of UEs to be allocated with a predefined service.

2. The system as claimed in claim 1, wherein the processor is further configured to: extract one or more Channel Quality Indicator (CQI) and one or more resource block (RB) constraints associated with one or more MIMO base stations transmission channels; and, apply the one or more Channel Quality Indicator (CQI) and the one or more resource block (RB) constraints to determine whether the determined number of UEs to be allocated are for a single user (SU)-MIMO base station or a multi-user (MU) MIMO base station.

3. The system as claimed in claim 2, wherein the processor is associated with a MU-MIMO grid module, wherein the MU-MIMO grid module is further configured to determine a number of candidate UEs for the MU-MIMO base station based on the number of UEs allocated to MU-MIMO base station.

4. The system as claimed in claim 3, wherein the processor is associated with a MU-MIMO candidate pairing module, wherein the MU-MIMO candidate pairing module is further configured to determine one or more resource blocks (RB) for each candidate UE for the MU-MIMO base station; determine one or more layers required for each said candidate UE for the MU-MIMO base station transmission.

5. The system as claimed in claim 3, wherein the processor is further configured to: receive one or more Sounding Reference Signal (SRS) resources from the one or more MIMO base stations for each said candidate UE; extract one or more configured parameters associated with the one or more SRS resources; and, based on the one or more configured parameters, estimate one or more channel coefficients for each said candidate UE for MU-MIMO transmission.

6. The system as claimed in claim 5, wherein the processor is further configured to compute a precoder based on the one or more channel coefficients.

7. The system as claimed in claim 6, wherein the precoder is further configured to: determine an orthogonality basis for each said candidate UE; mitigate interference from one or more co-scheduled candidate UEs associated with each said candidate UE; and, avoid Inter-layer interference in the one or more co-scheduled candidate UEs associated with each said candidate UE.

8. The system as claimed in claim 1, wherein the processor is further configured to maintain separate queues for the one or more services.

9. The system as claimed in claim 8, wherein the one or more services comprise retransmission Queues, signalling radio bearer (SRB) Queues, Voice over New radio (VoNR) Queues, Guaranteed Bit Rate (GBR) Queues and Non-Guaranteed Bit Rate (Non-GBR) Queues.

10. The system as claimed in claim 1, wherein the processor is further configured to store one or more operational parameters and one or more default configuration parameters of the system.

11. The system as claimed in claim 1, wherein depending on a geographical deployment area, the processor is further configured to accept the default configuration parameters of the system.

12. A method facilitating improved resource sharing in a distributed wireless communication system, said method comprising:
receiving, by a processor, one or more data packets from the one or more MIMO base stations, the one or more data packets pertaining to parameters associated with one or more resources that require allocation in the distributed wireless communication system to one or more user equipment getting registered with the system through a respective packet gateway node,
wherein the processor is operatively coupled to a scheduler operatively coupled to any or a combination of one or more Multi input multi output (MIMO) base stations, and one or more packet gateway nodes (NG1, NG2, . . . . NGN),
wherein, the one or more MIMO base stations, the one or more packet gateway nodes are communicatively coupled to the one or more user equipment (UE) through a communication network;
extracting, by the processor, a first set of attributes from the one or more data packets, the first set of attributes pertaining to one or more services associated with the one or more resources;
extracting, by the processor, a second set of attributes from the one or more data packets, the second set of attributes pertaining to a user traffic data queued in the scheduler associated with one or more services;
extracting, by the processor, a third set of attributes from a database operatively coupled to a centralized server, the third set of attributes pertaining to one or more priority services that gain precedence over one or more services, wherein the centralized server is further operatively coupled to the system;

determining, by the processor, based the extracted first, second and third set of attributes a service priority list;

categorizing, by the processor, each user traffic data queue based on the service priority list;

calculating, a user priority metric for each user traffic data queue based on the categorized user traffic data queue;

based on the calculated user priority metric, determining, a number of UEs to be allocated with a predefined service.

13. The method as claimed in claim 12, wherein the method further comprises the steps of: extracting, by the processor, one or more Channel Quality Indicator (CQI) and one or more resource block (RB) constraints associated with one or more MIMO base stations transmission channels; and, applying, by the processor, the one or more Channel Quality Indicator (CQI) and the one or more resource block (RB) constraints to determine whether the determined number of UEs to be allocated are for a single user (SU)-MIMO base station or a multi-user (MU) MIMO base station.

14. The method as claimed in claim 13, wherein the method further comprises the step of: determining, by a MU-MIMO grid module associated with the processor, a number of candidate UEs for the MU-MIMO base station based on the number of UEs allocated to MU-MIMO base station.

15. The method as claimed in claim 14, wherein the method further comprises the steps of: 33 determining, by a MU-MIMO candidate pairing module of the processor, one or more resource blocks (RB) for each candidate UE for the MU-MIMO base station; determining, by the MU-MIMO candidate pairing module, one or more layers required for each said candidate UE for the MU-MIMO base station transmission.

16. The method as claimed in claim 14, wherein the method further comprises the steps of: receiving, by the processor, one or more Sounding Reference Signal (SRS) resources from the one or more MIMO base stations for each said candidate UE; extracting, by the processor, one or more configured parameters associated with the one or more SRS resources; and, based on the one or more configured parameters, estimating, by the processor, one or more channel coefficients for each said candidate UE for MU-MIMO transmission.

17. The method as claimed in claim 16, wherein the method further comprises the steps of: computing a precoder based on the one or more channel coefficients.

18. The method as claimed in claim 17, wherein the method further comprises the steps of: determining, by the processor, an orthogonality basis for each said candidate UE; mitigating, by the processor, interference from one or more co-scheduled candidate UEs associated with each said candidate UE; and, avoiding, by the processor, Inter-layer interference in the one or more coscheduled candidate UEs associated with each said candidate UE.

19. The method as claimed in claim 12, wherein the method further comprises the step of: maintaining separate queues for the one or more services.

20. The method as claimed in claim 19, wherein the one or more services comprise retransmission Queues, signalling radio bearer (SRB) Queues, Voice over New radio (VoNR) Queues, Guaranteed Bit Rate (GBR) Queues and Non-Guaranteed Bit Rate (Non-GBR) Queues.

* * * * *